(12) United States Patent
Ueda

(10) Patent No.: US 10,908,583 B2
(45) Date of Patent: Feb. 2, 2021

(54) SAFETY CONTROL SYSTEM AND SAFETY CONTROL UNIT

(71) Applicant: OMRON Corporation, Kyoto (JP)

(72) Inventor: Takamasa Ueda, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/275,340

(22) Filed: Feb. 14, 2019

(65) Prior Publication Data

US 2019/0302730 A1    Oct. 3, 2019

(30) Foreign Application Priority Data

Mar. 30, 2018  (JP) ................................ 2018-067769

(51) Int. Cl.
*G05B 19/406*  (2006.01)
*G05B 19/042*  (2006.01)

(52) U.S. Cl.
CPC ....... *G05B 19/406* (2013.01); *G05B 19/0425* (2013.01); *G05B 2219/31103* (2013.01); *G05B 2219/50193* (2013.01)

(58) Field of Classification Search
None
See application file for complete search history.

(56) References Cited

U.S. PATENT DOCUMENTS

| 2015/0169493 | A1 | 6/2015 | Gehrke |
| 2017/0242693 | A1 | 8/2017 | Izaki |
| 2018/0203818 | A1* | 7/2018 | Fukuda ................. H04L 12/403 |
| 2019/0317466 | A1* | 10/2019 | Ueda .................... G05B 19/058 |

FOREIGN PATENT DOCUMENTS

JP    2005031778    2/2005

OTHER PUBLICATIONS

"Search Report of Europe Counterpart Application", dated Aug. 9, 2019, pp. 1-9.

* cited by examiner

*Primary Examiner* — Sean Shechtman
(74) *Attorney, Agent, or Firm* — JCIPRNET

(57) ABSTRACT

A safety control system that can realize comprehensive safety control for a manufacturing site is provided. A safety control system includes an arithmetic operation processing unit, a data storing unit that stores safety input/output data, and a plurality of communication processing units that exchange safety input/output data with a device that is a connection destination. Each of the plurality of communication processing units, independently from processes of the other communication processing units, periodically transmits safety output data for a target device stored in the data storing unit to the target device and writes safety input data from the target device into the data storing unit in accordance with a connection setting set in advance for each of the communication processing units.

10 Claims, 10 Drawing Sheets

SAFETY CONTROL SYSTEM AND SAFETY CONTROL UNIT

CROSS-REFERENCE TO RELATED APPLICATION

This application claims the priority benefit of Japan application serial no. 2018-067769, filed on Mar. 30, 2018. The entirety of the above-mentioned patent application is hereby incorporated by reference herein and made a part of this specification.

BACKGROUND

Technical Field

The disclosure relates to a safety control system and a safety control unit realizing functional safety.

Description of Related Art

In order to safely use facilities and machines used at various manufacturing sites, it is necessary to realize functional safety in accordance with international standards such as International Electrotechnical Commission (IEC) 61508. Such functional safety may be realized by a safety control device executing a safety program. For example, Japanese Laid-open Patent Publication No. 2005-031778 discloses a safety controller that controls an operation of machine facilities by giving a safety output to a safety output control target on the basis of an input from an input device.

As one method for realizing comprehensive functional safety for facilities, machines, and the like present at a manufacturing site, in a configuration in which various safety components are connected to the safety control device as described above, safety control is executed for a safety input signal input from each safety component, and a safety output signal is given to each safety component on the basis of a result of the control.

Meanwhile, connection forms and communication protocols for connecting the safety control device to the safety components are not necessarily uniform, and thus there are a plurality of forms and protocols. For example, when a communication protocol that can be used by a safety control device that has been newly introduced and a communication protocol that can be used by an existing safety component do not coincide with each other, it is necessary to employ a configuration in which a wiring is laid between the safety component and the safety control device, and an electric signal is directly exchanged therebetween.

SUMMARY

The disclosure is to solve the problems described above, and the disclosure provides a safety control system capable of realizing comprehensive safety control for a manufacturing site.

According to one example of the disclosure, a safety control system realizing functional safety is provided. The safety control system includes: an arithmetic operation processing unit that executes one or a plurality of safety programs, a data storing unit that stores safety input data referred to by the one or plurality of safety programs and safety outputs data output in accordance with execution of the one or plurality of safety programs, and a plurality of communication processing units that exchange safety input/output data with a device that is a connection destination. Each of the plurality of communication processing units, independently from processes of the other communication processing units, periodically transmits safety output data for a target device stored in the data storing unit to the target device and writes safety input data from the target device into the data storing unit in accordance with a connection setting set in advance for each of the communication processing units.

According to one example of this disclosure, a safety control unit realizing functional safety is provided. The safety control unit includes: an arithmetic operation processing unit that executes one or a plurality of safety programs, a data storing unit that stores safety input data referred to by the one or plurality of safety programs and safety output data output in accordance with execution of the one or plurality of safety programs, and a plurality of communication processing units that exchange safety input/output data with a device that is a connection destination. Each of the plurality of communication processing units, independently from processes of the other communication processing units, periodically transmits safety output data for a target device stored in the data storing unit to the target device and writes safety input data from the target device into the data storing unit in accordance with a connection setting set in advance for each of the communication processing units.

DESCRIPTION OF THE EMBODIMENTS

Figure 1:
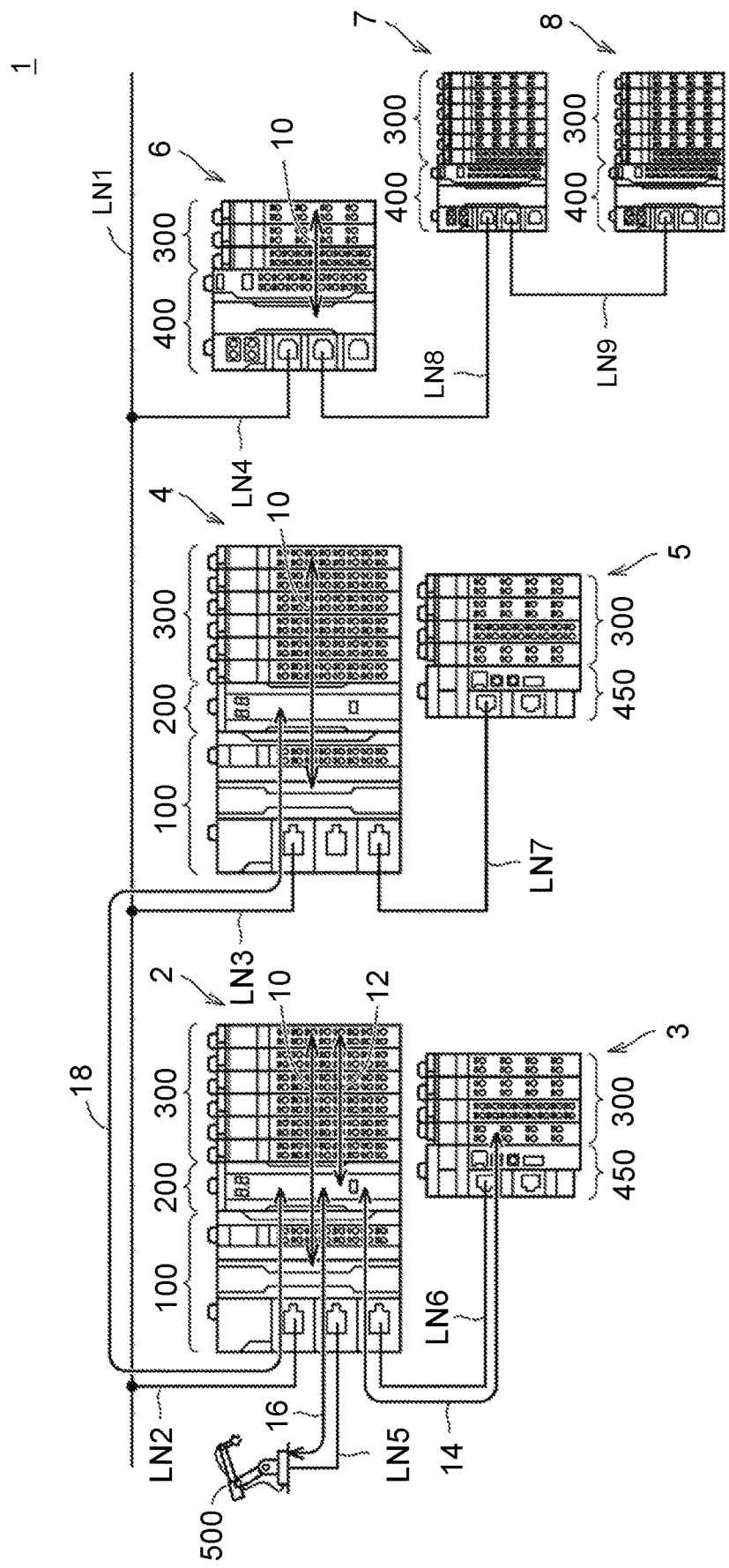
FIG. 1 is a schematic diagram illustrating an example of the configuration of a safety control system according to this embodiment.

An embodiment of the disclosure will be described in detail with reference to the drawings. The same reference sign will be assigned to the same parts or parts corresponding to each other in the drawings, and description thereof will not be repeated.

A. Application Example

First, one example of a view to which the disclosure is applied will be described. FIG. 1 is a schematic diagram illustrating an example of the configuration of a safety control system 1 according to this embodiment. The safety control system 1 is a system for realizing functional safety.

In FIG. 1, the safety control system 1 having a control device 2 and a control device 4 as its major components is illustrated as one example. In the safety control system 1, the control device 2 is connected to a wiring LN1 that is a backbone wiring through a wiring LN2, and the control device 4 is connected to the wiring LN1 through a wiring LN3.

Each of the control device 2 and the control device 4 may be configured to execute standard control and safety control.

In description here, the term "standard control" typically collectively refers to processes for controlling a control target in accordance with required specifications set in advance. On the other hand, the "safety control" collectively refers to processes for preventing persons from being endangered by a certain facility, a certain machine, or the like due to a certain malfunction. The safety control, for example, realizes functional safety defined in International Electrotechnical Commission (IEC) 61508 or the like. More specifically, the safety control includes a process that stops a control target not only in a case in which a behavior of the control target is different from the original behavior but also in a case in which it is determined that a certain abnormality has occurred in the control device 2.

Although both the standard control and the safety control may be realized by the same unit, in the safety control system 1, a configuration example is illustrated in which a standard control unit 100 mainly responsible for the standard control and a safety control unit 200 mainly responsible for the safety control are used.

In other words, each of the control device 2 and the control device 4 is composed of a standard control unit 100 and a safety control unit 200. The safety control unit 200 serving as one type of local unit is connected to the standard control unit 100 through a local bus 10.

In description here, a "local unit" collectively refers to an arbitrary unit connected through the local bus 10.

Each of the control device 2 and the control device 4 additionally includes one or a plurality of safety IO units 300. The safety IO unit 300 manages an input of a signal from a safety component and/or an output of a signal to a safety component. In the disclosure herein, the "safety component" mainly includes arbitrary devices used for the safety control and, for example, includes a safety relay, various safety sensors, and the like.

The safety control unit 200 exchanges safety IO data with one or a plurality of safety IO units 300 through the local bus 10. In description here, the term "IO data" includes input data acquired from a control target or a safety component and/or output data output to a control device or a safety component. In the "IO data", particularly, safety input/output data used for the safety control will be referred to as "safety IO data".

The control device 2 is additionally connected to a remote IO device 3 through a wiring LN6, and the control device 4 is additionally connected to a remote IO device 5 through a wiring LN7. Generally, the remote IO device 3 and the remote IO device 5 are disposed at positions different from those of the control device 2 and the control device 4, exchange signals with a control target or a safety component, and exchange IO data corresponding to the exchange of signals with the standard control unit 100.

More specifically, each of the remote IO device 3 and the remote IO device 5 is composed of a communication coupler unit 450 and one or a plurality of safety IO units 300. A safety IO unit 300 as one type of local unit is connected to the communication coupler unit 450 through a local bus (not illustrated in the drawing).

The safety control system 1 additionally includes a remote IO device 6, a remote IO device 7, and a remote IO device 8. The remote IO device 6 is connected to the wiring LN1 through a wiring LN4. The remote IO device 7 is connected to the remote IO device 6 through a wiring LN8. The remote IO device 8 is connected to the remote IO device 7 through a wiring LN9.

Each of the remote IO device 6, the remote IO device 7, and the remote IO device 8 is composed of a communication unit 400 and one or a plurality of safety IO units 300. The safety IO unit 300 as one type of local unit is connected to the communication unit 400 through a local bus (not illustrated in the drawing). The basic function and the basic configuration of the communication unit 400 are similar to those of the communication coupler unit 450.

In addition, the control device 2 is also connected to a robot 500 including a safety component through a wiring LN5 using a network.

In the safety control system 1 according to this embodiment, the safety control unit 200 can establish one or a plurality of connections, which are independent from each other, with another control unit and/or the communication unit 400. In each connection, safety IO data can be exchanged at every period set in advance.

For example, when focusing on the safety control unit 200 of the control device 2, (1) a first connection 12 established with one or a plurality of safety IO units 300 connected through the local bus 10 of the control device 2, (2) a second connection 14 established between the control device 2 and the remote IO device 3 connected through the wiring LN6, (3) a third connection 16 established between the control device 2 and the robot 500 connected through the wiring LN5, (4) a fourth connection 18 established between the control device 2 and the safety control unit 200 of the control device 4 connected through the wirings LN2, LN1, and LN3 are managed.

(1) First Connection 12

In the local bus 10, data transmission according to a communication protocol that is specific to a manufacturer of the control device 2 or data transmission according to a standardized communication protocol such as Ethernet for Control Automation Technology (a registered trademark) is performed. For example, in a case in which transmission of a form in which process data is sequentially transmitted at a predetermined period is employed as a manufacturer-specific communication protocol, by inserting a message frame called a Safety over EtherCAT (FSoE) into the process data, exchange of safety IO data between connections can be realized. On the other hand, in a case in which data transmission according to EtherCAT is employed, by inserting an FSoE frame (message frame) into process data that is sequentially transmitted in accordance with EtherCAT, exchange of safety IO data between connections can be realized.

In this way, in a case in which the first connection 12 is established between the safety control unit 200 and a specific safety IO unit 300 through the local bus 10, a target unit with which an FSoE frame is to be exchanged, a data size thereof, and the like are defined in advance.

(2) Second Connection 14

Also, in the wiring LN6 between the control device 2 and the remote IO device 3, data transmission according to a standardized communication protocol, such as EtherCAT, is performed. Also, between the safety control unit 200 of the control device 2 and one or the plurality of safety IO units 300 of the remote IO device 3, exchange of safety IO data is realized using an FSoE frame.

EtherCAT is an Ethernet-based communication protocol, and Ethernet (a registered trademark) is employed in a physical layer and a data link layer (network interface layer) of EtherCAT, and, accordingly, a medium that can transmit packets such as a local area network (LAN) cable is used for the wiring LN6.

In this way, in a case in which the second connection 14 is established between the safety control unit 200 and a specific safety IO unit 300 through the wiring LN6, a target unit with which an FSoE frame is exchanged, a data size thereof, and the like are defined in advance.

Here, in the control device 2, a network interface responsible for data transmission according to EtherCAT (a field bus controller 112 illustrated in FIG. 2) is mounted in the standard control unit 100. For this reason, in the control device 2, the standard control unit 100 directly exchanges an FSoE frame with a safety IO unit 300 as the target device, and the safety control unit 200 receives an FSoE frame from the safety IO unit 300 using a data frame on the local bus 10 that is periodically exchanged with the standard control unit 100 as a relay medium and transmits the FSoE frame to the safety IO unit 300. Details of the process using a data frame on the local bus 10 as a relay medium will be described later.

(3) Third Connection 16

In the wiring LN5 between the control device 2 and the robot 500, data transmission according to an industrial communication protocol is performed. As such industrial communication protocols, there are EtherNet/Internet protocol (IP), DeviceNet, CompoNet, ControlNet, and the like. In this embodiment, as a typical example, it is assumed that data transmission according to EtherNet/IP is employed. By using such a communication protocol of data transmission, a communication protocol such as a common industrial protocol (CIP) or CIP safety is mounted as an application layer.

As a typical example, between the safety control unit 200 of the control device 2 and the robot 500, a configuration in which safety IO data is exchanged in accordance with CIP Safety mounted using an EtherNet/IP is illustrated. The EtheNet/IP is an Ethernet-based communication protocol. CIP Safety is a communication protocol associated with functional safety standards such as IEC 61508 using the CIP as a base.

In this way, in a case in which the third connection 16 is established between the safety control unit 200 and the robot 500 through the wiring LN5, a data size for exchanging a data frame according to CIP Safety (hereinafter, abbreviated to a "CIP frame"), a tag name designating a target variable, and the like are defined in advance.

Here, in the control device 2, a network interface responsible for data transmission according to the EtherNet/IP (a network controller 110 illustrated in FIG. 2) is mounted in the standard control unit 100. For this reason, in the control device 2, the standard control unit 100 directly exchanges a CIP frame according to CIP Safety with a target robot 500, and the safety control unit 200 receives a CIP frame from the robot 500 using a data frame on the local bus 10 that is periodically exchanged with the standard control unit 100 as a relay medium and transmits the CIP frame to the robot 500. Details of the process using a data frame on the local bus 10 as a relay medium will be described later.

(4) Fourth Connection 18

In the wirings LN2, LN1, and LN3 between the control device 2 and the control device 4, data transmission according to an industrial communication protocol is performed. As described above, as industrial communication protocols, there are EtherNet/IP, DeviceNet, CompoNet, ControlNet, and the like. In this embodiment, as a typical example, it is assumed that data transmission according to the EtherNet/IP is employed. In addition, between the safety control unit 200 of the control device 2 and the safety control unit 200 of the control device 4, safety IO data is exchanged in accordance with the CIP Safety mounted using the EtherNet/IP.

In this way, in a case in which the fourth connection 18 is established between the safety control unit 200 of the control device 2 and the safety control unit 200 of the control device 4 through the wirings LN2, LN1, and LN3, data size for exchange of a data frame according to the CIP Safety (hereinafter, abbreviated to a "CIP frame"), a tag name designating a target variable, and the like are defined in advance.

Here, in the control device 2, a network interface responsible for data transmission according to the EtherNet/IP (a network controller 108 illustrated in FIG. 2) is mounted in the standard control unit 100. For this reason, in the control device 2, the standard control unit 100 directly exchanges a CIP frame according to the CIP Safety with the safety control unit 200 as the target device, and, by using a data frame on the local bus 10 periodically exchanged with the standard control unit 100 as a relay medium, the safety control unit 200 receives a CIP frame from the safety control unit 200 of the control device 4 and transmits the CIP frame to the safety control unit 200 of the control device 4. Details of the process using a data frame on the local bus 10 as a relay medium will be described later. In addition, also, between the standard control unit 100 and the safety control unit 200 of the control device 4, similar to the case of between the standard control unit 100 and the safety control unit 200 of the control device 2, a connection is established using a data frame on the local bus 10 as a relay medium.

As described above, in the safety control system 1 according to this embodiment, the safety control unit 200 of the control device 2 maintains a plurality of connections that are independent from each other, and both of safety control that is independent for each connection and/or safety control that associates a plurality of connections with each other can be realized using safety IO data exchanged using each connection.

As used herein, a "device" includes an arbitrary device or an arbitrary unit that can exchange safety IO data.

B. Example of Hardware Configuration

Next, an example of the hardware configuration of major devices configuring the safety control system 1 according to this embodiment will be described.

(b1: Standard Control Unit 100)

Figure 2:
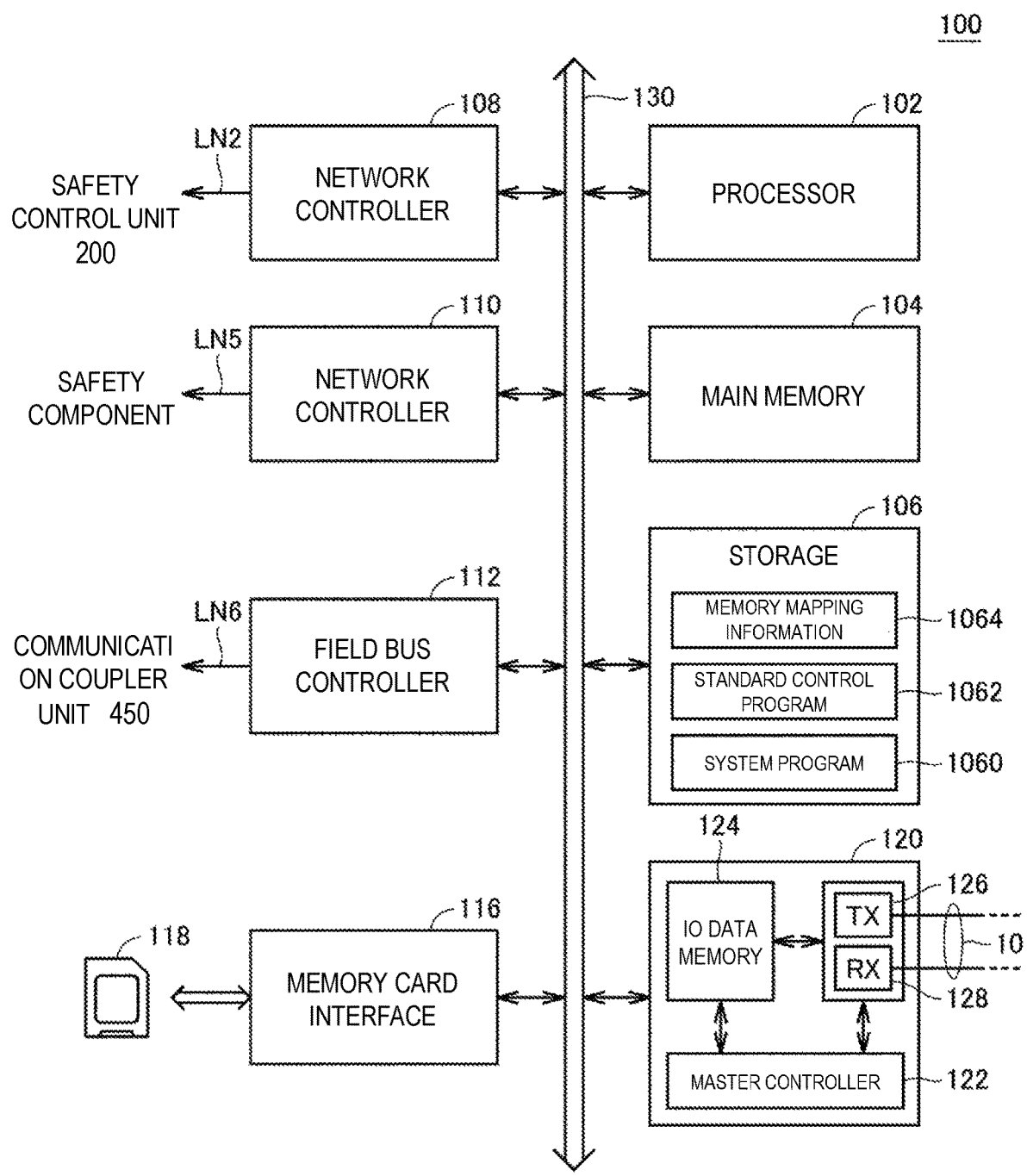
FIG. 2 is a schematic diagram illustrating an example of the hardware configuration of a standard control unit configuring a control device according to this embodiment.

FIG. 2 is a schematic diagram illustrating an example of the hardware configuration of the standard control unit 100 configuring the control device 2 according to this embodiment. As illustrated in FIG. 2, the standard control unit 100 includes a processor 102, a main memory 104, a storage 106, network controllers 108 and 110, a field bus controller 112, a memory card interface 116, and a local bus controller 120. Such components are connected through a processor bus 130.

The processor 102 corresponds to an arithmetic operation processing unit executing a control operation and the like and may be composed of a central processing unit (CPU), a graphics processing unit (GPU), or the like. More specifically, the processor 102 reads programs (a system program 1060 and a standard control program 1062) stored in the storage 106, expands the programs into the main memory 104, and executes the programs, thereby realizing control according to a control target and various processes to be described later.

The main memory 104 is configured by a volatile storage device such as a dynamic random access memory (DRAM) or a static random access memory (SRAM), or the like. The storage 106, for example, is configured by a nonvolatile storage device such as a hard disk drive (HDD) or a solid state drive (SSD), or the like.

In the storage 106, except for storing a system program 1060 for realizing a basic function, and, in addition, a standard control program 1062 generated in accordance with a control target such as a facility or a machine is also stored therein. Furthermore, in the storage 106, memory mapping information 1064 used for relaying data transmission, which is performed by the safety control unit 200, using the network controllers 108 and 110 and/or the field bus controller 112 is also stored in the storage 106.

The network controllers 108 and 110 exchange data frames with other control devices, arbitrary devices, and other arbitrary information processing devices through an arbitrary industrial network. In FIG. 2, although a configuration having two network controllers 108 and 110 is illustrated, a configuration having a single network controller may be employed.

The field bus controller 112 exchanges data frames with a remote device through an arbitrary field bus. In FIG. 2, although a configuration having a single field bus controller 112 is illustrated, a configuration including a plurality of field bus controllers may be employed.

The memory card interface 116 is configured such that a memory card 118 that is one example of a recording medium can be detachably attached thereto. The memory card interface 116 is configured to be able to write arbitrary data into the memory card 118 and read arbitrary data from the memory card 118.

The local bus controller 120 exchanges data frames with the safety control unit 200 and an arbitrary safety IO unit 300 through the local bus 10. More specifically, the local bus controller 120 includes a master controller 122, an IO data memory 124, a transmitting circuit (TX) 126, and a receiving circuit (RX) 128.

The IO data memory 124 is a memory that temporarily stores IO data exchanged with an arbitrary local unit through the local bus 10, and an address is defined in association with each local unit in advance. The transmitting circuit 126 generates a communication frame including output data and transmits the generated communication frame to the local bus 10. The receiving circuit 128 receives a communication frame transmitted on the local bus 10 and demodulates the communication frame into input data. The master controller 122 controls the IO data memory 124, the transmitting circuit 126, and the receiving circuit 128 in accordance with a data transmission timing and the like on the local bus 10. The master controller 122 provides control as a communication master managing data transmission on the local bus 10 and the like.

Although a configuration example in which necessary functions are provided by the processor 102 executing programs has been illustrated in FIG. 2, some or all of the provided functions may be mounted using a dedicated hardware circuit (for example, an application specific integrated circuit (ASIC) or a field-programmable gate array (FPGA), or the like). Alternatively, major parts of the standard control unit 100 may be realized using hardware according to a general-purpose architecture (for example, an industrial PC based on a general-purpose PC). In such a case, a plurality of operating systems (OS) having different purposes may be executed in a parallel manner using a virtualization technology, and a necessary application may be executed on each OS. In addition, a configuration integrating functions of a display device, a supporting device, and the like in the standard control unit 100 may be employed.

For example, in a case in which a supporting device is directly connected to the standard control unit 100, a universal serial bus (USB) port and a USB controller for exchanging data with the supporting device may further be disposed.

(b2: Safety Control Unit 200)

Figure 3:
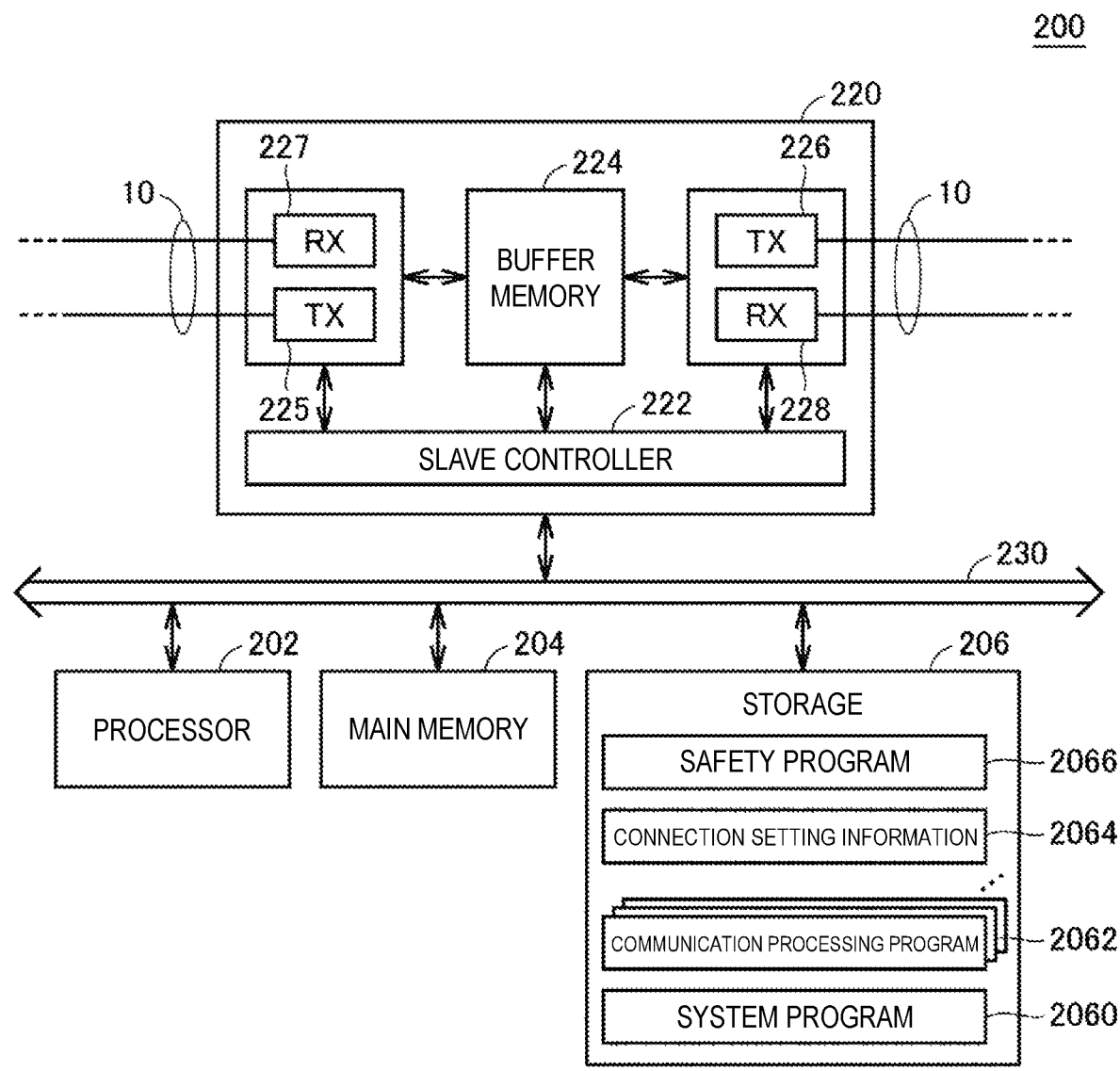
FIG. 3 is a schematic diagram illustrating an example of the hardware configuration of a safety control unit configuring the control device according to this embodiment.

FIG. 3 is a schematic diagram illustrating an example of the hardware configuration of the safety control unit 200 configuring the control device 2 according to this embodiment. As illustrated in FIG. 3, the safety control unit 200 includes a processor 202, a main memory 204, a storage 206, and a local bus controller 220. Such components are connected through a processor bus 230.

The processor 202 corresponds to an arithmetic operation processing unit that executes one or a plurality of safety programs.

The local bus controller 220 functions as a slave device for communication and provides a communication interface that is similar to another local unit. In other words, the local bus controller 220 exchanges data frames with the standard control unit 100 and a local unit through the local bus 10.

On the local bus 10, the safety control unit 200 and the safety IO unit 300 are connected using, for example, a daisy chain connection. When a communication frame addressed to its own unit arrives from a device located on the upstream side on the local bus 10, the local bus controller 220 takes in the communication frame that has arrived. Similarly, the local bus controller 220, when a communication frame addressed to its own unit arrives from a device located on the downstream side on the local bus 10, takes in the communication frame that has arrived. In a case in which a communication frame not addressed to its own unit has arrived, the communication frame passes through the local bus controller 220 as it is. In accordance with the reception or the passage of the communication frame, inter-node data transmission among the standard control unit 100, the local unit, and the safety control unit 200 is realized.

More specifically, the local bus controller 220 includes a slave controller 222, a buffer memory 224, transmitting circuits (TX) 225 and 226, and receiving circuits (RX) 227 and 228.

The buffer memory 224 temporarily stores a communication frame transmitted through the local bus 10.

When a communication frame transmitted on the local bus 10 is received, the receiving circuit 227 stores the whole or a part thereof in the buffer memory 224. The transmitting circuit 226 transmits the communication frame received by the receiving circuit 227 to the local bus 10 on the downstream side.

Similarly, when a communication frame transmitted on the local bus 10 is received, the receiving circuit 228 stores the whole or a part thereof in the buffer memory 224. The transmitting circuit 225 transmits the communication frame received by the receiving circuit 128 to the local bus 10 disposed on the downstream side.

In order to realize sequential transmission of communication frames on the local bus 10, the slave controller 222 controls the transmitting circuits 225 and 226, the receiving circuits 227 and 228, and the buffer memory 224.

The processor 202 corresponds to an arithmetic operation processing unit that executes a control operation and the like and may be composed of a CPU, a GPU, or the like. More specifically, the processor 202 reads programs (as an example, a system program 2060, a communication processing program 2062, and a safety program 2066) stored in the storage 206, expands the programs into the main memory 204, and executes the programs, thereby realizing control according to a control target and various processes to be described later.

The main memory 204 is configured by a volatile storage device such as a DRAM or an SRAM or the like. The storage 206, for example, is configured by a nonvolatile storage device such as an HDD or an SSD or the like.

In the storage 206, in addition to a system program 2060 for realizing a basic function, a communication processing program 2062 for establishing and maintaining a connection for exchange of data frames with other safety control unit 200 and/or the safety IO unit 300, connection setting information 2064 including setting information required for establishing and maintaining a connection, and a safety program 2066 generated in accordance with a safety IO unit 300 as the target device are stored.

Although a configuration example in which necessary functions are provided by the processor 202 executing programs has been illustrated in FIG. 3, all or some of the provided functions may be mounted using a dedicated hardware circuit (for example, an ASIC, an FPGA, or the like).

(b3: Safety IO Unit 300)

Figure 4:
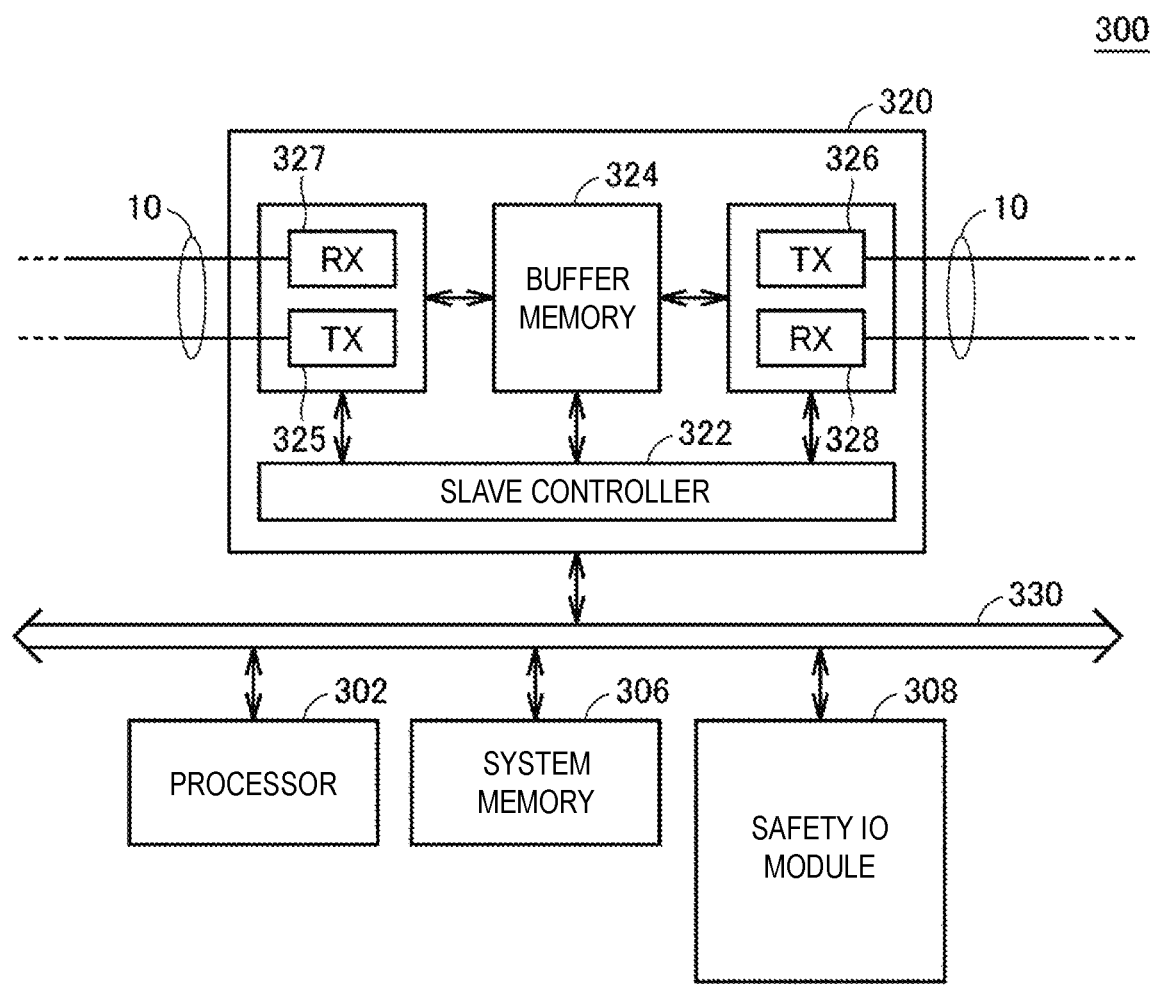
FIG. 4 is a schematic diagram illustrating an example of the hardware configuration of a safety IO unit configuring the control device according to this embodiment.

FIG. 4 is a schematic diagram illustrating an example of the hardware configuration of the safety IO unit 300 configuring the control device 2 according to this embodiment. As illustrated in FIG. 4, the safety IO unit 300 includes a processor 302, a system memory 306, a safety IO module 308, and a local bus controller 320. Such components are connected through a processor bus 330.

The local bus controller 320 functions as a slave device for communication and provides a communication interface similar to other local units. The local bus controller 320 includes a slave controller 322, a buffer memory 324, transmitting circuits (TX) 325 and 326, and receiving circuits (RX) 327 and 328. The basic configuration of the local bus controller 320 is similar to the local bus controller 220 illustrated in FIG. 3, and thus detailed description thereof will not be repeated here.

The processor 302 corresponds to an arithmetic operation processing unit executing various processes in the safety IO unit 300. The system memory 306 is configured by a flash memory, a non-volatile RAM (NVRAM), or the like and stores various settings and firmware that are necessary for the process performed by the safety IO unit 300.

The safety IO module 308 performs an input process on a signal supplied from a field and/or an output process of outputting a signal to a field in accordance with the function of the safety IO unit 300. In addition, functions that are unique to safety control such as detection of formation of a short circuit and feedback detection are further implemented in the safety IO module 308.

Although a configuration example in which necessary functions are provided using the processor 302 has been illustrated in FIG. 4, some or all of the provided functions may be mounted using a dedicated hardware circuit (for example, an ASIC, an FPGA, or the like).

(b4: Communication Unit 400)

Figure 5:
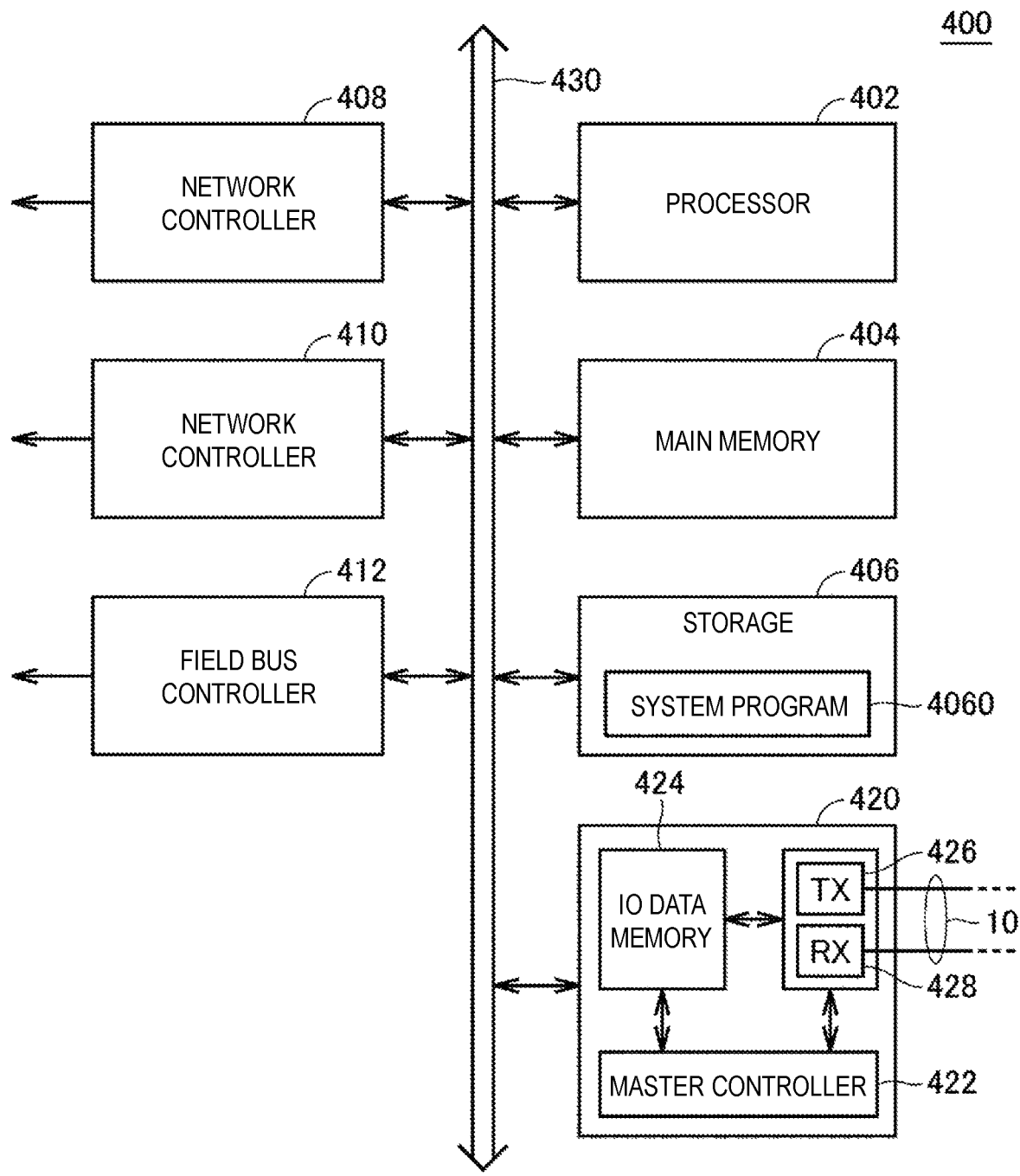
FIG. 5 is a schematic diagram illustrating an example of the hardware configuration of a communication unit configuring the control device according to this embodiment.

FIG. 5 is a schematic diagram illustrating an example of the hardware configuration of the communication unit 400 configuring the control device 2 according to this embodiment. As illustrated in FIG. 5, the communication unit 400 includes a processor 402, a main memory 404, a storage 406, network controllers 408 and 410, a field bus controller 412, and a local bus controller 420. Such components are connected through a processor bus 430.

The processor 402 corresponds to an arithmetic operation processing unit that executes a control operation and the like and is composed of a CPU, a GPU, and the like. More specifically, the processor 402 reads a system program 4060 stored in the storage 406, expands the program into the main memory 404, and executes the program, thereby realizing various processes for relaying exchange of IO data between a local unit (the safety IO unit 300 or the like) that is connected through the local bus 10 and the standard control unit 100 and/or the safety control unit 200.

The main memory 404 is configured by a volatile storage device such as a DRAM or an SRAM or the like. The storage 406, for example, is configured by a nonvolatile storage device such as an HDD or an SSD or the like.

In the storage 406, a system program 4060 for realizing a function of the local unit for exchanging IO data is stored.

The network controllers 408 and 410 exchange data frames with another control device, an arbitrary device, and other arbitrary information processing devices through an arbitrary industrial network. Although a configuration having two network controllers 408 and 410 is illustrated in FIG. 5, a configuration having a single network controller may be employed.

The field bus controller 412 exchanges a data frame with a remote device through an arbitrary field bus. Although a configuration having the single field bus controller 412 is illustrated in FIG. 5, a configuration having a plurality of field bus controllers may be employed.

The local bus controller 420 exchanges data frames with the safety control unit 200 and an arbitrary safety IO unit 300 through the local bus 10. More specifically, the local bus controller 420 includes a master controller 422, an IO data memory 424, a transmitting circuit (TX) 426, and a receiving circuit (RX) 428.

The IO data memory 424 is a memory that temporarily stores IO data to be exchanged with an arbitrary local unit through the local bus 10, and an address is defined in advance in association with each local unit. The transmitting circuit 426 generates a communication frame including output data and transmits the generated communication frame on the local bus 10. The receiving circuit 428 demodulates a communication frame transmitted on the local bus 10 and demodulates the received communication frame into input data. The master controller 422 controls the IO data memory 424, the transmitting circuit 426, and the receiving circuit 428 in accordance with a data transmission timing and the like on the local bus 10. The mater controller 422 provides control as a communication master that manages data transmission on the local bus 10 and the like.

Although a configuration example in which necessary functions are provided by the processor 402 executing programs is illustrated in FIG. 5, some or all of the provided functions may be mounted using a dedicated hardware circuit (for example, an ASIC, an FPGA, or the like).

(b5: Communication Coupler Unit 450)

The main configuration of the communication coupler unit 450 is similar to the communication unit 400 except that the type or the number of networks of a connection destination are different from those of the communication unit 400. For this reason, detailed description thereof will not be repeated here.

C. Connection Group and Safety Program of Safety Control System 1

Next, one example of the safety program executed by the safety control unit 200 of the control device 2 will be described.

Figure 6:
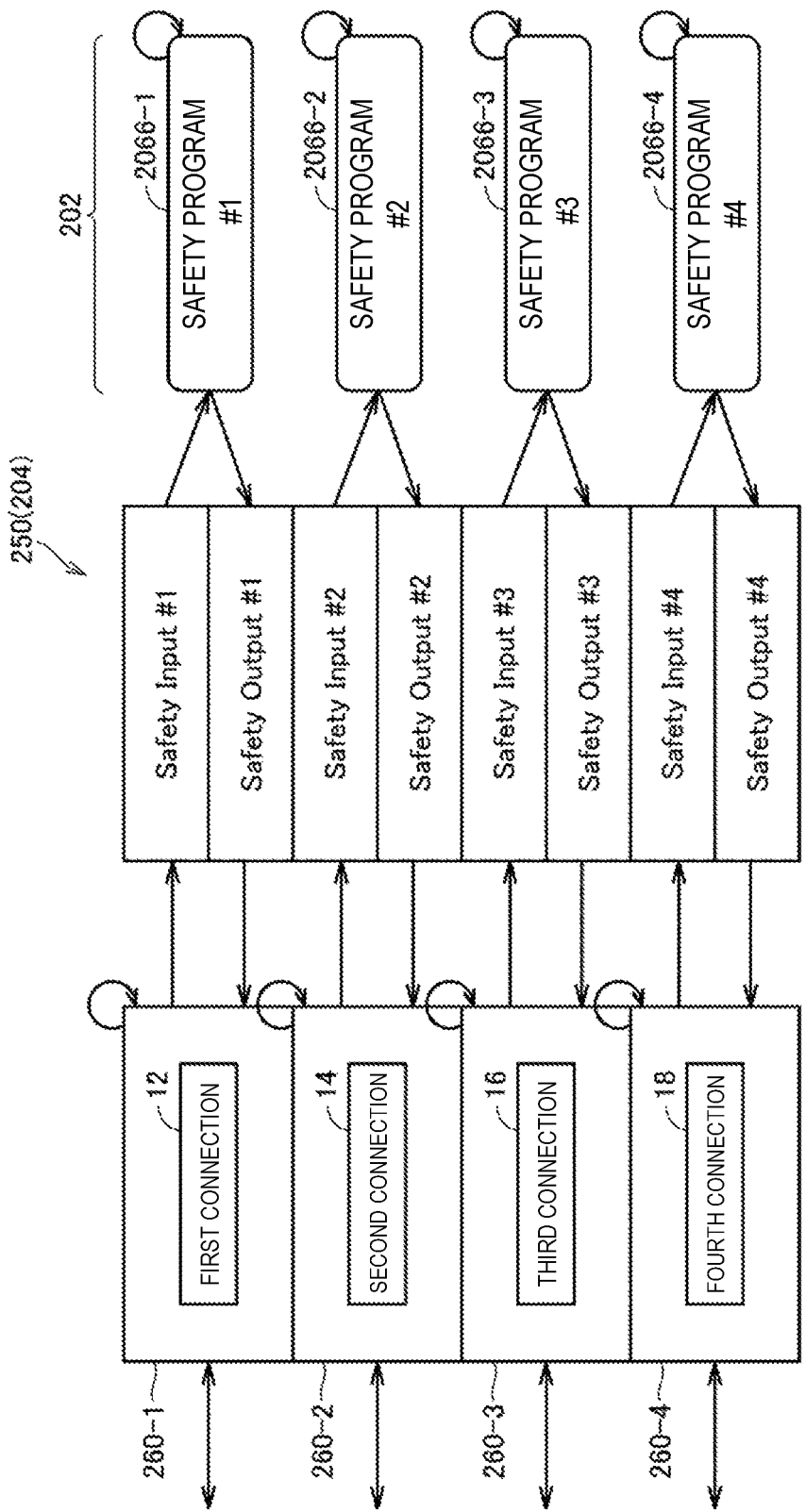
FIG. 6 is a schematic diagram illustrating one example of an execution environment of a safety program in the safety control unit of the safety control system according to this embodiment.
Figure 7:
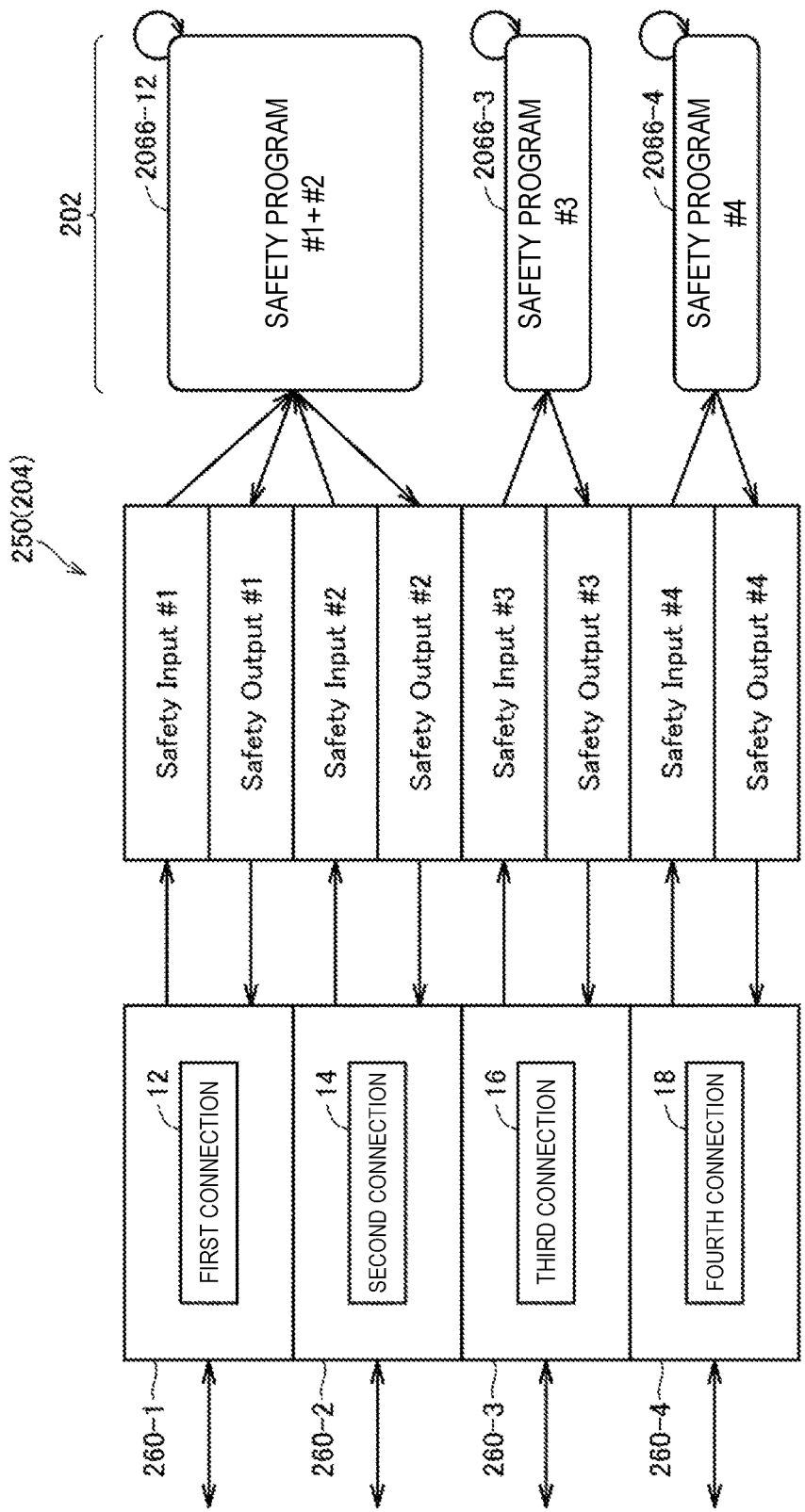
FIG. 7 is a schematic diagram illustrating one example of an execution environment of a safety program in the safety control unit of the safety control system according to this embodiment.

FIGS. 6 and 7 are schematic diagrams illustrating one example of an execution environment of a safety program in the safety control unit 200 of the safety control system 1 according to this embodiment. As illustrated in FIGS. 6 and 7, the safety control unit 200 includes four communication processing units 260-1, 260-2, 260-3, and 260-4. It is assumed that the communication processing unit 260-1 has established the first connection 12, the communication processing unit 260-2 has established the second connection 14, the communication processing unit 260-3 has established the third connection 16, and the communication processing unit 260-4 has established the fourth connection 18.

Each of the communication processing units 260-1 to 260-4 exchanges safety IO data with a safety IO unit 300 as the target device and/or the safety control unit 200 in accordance with each connection setting. In other words, each of the communication processing units 260-1 to 260-4 exchanges safety IO data with a device that is a connection destination.

A communication period (a transmission/reception period of an FSoE frame or a CIP frame) of each of the communication processing units 260-1 to 260-4 is set on the basis of a setting and a status of each connection. For example, the communication period may be changed also in accordance with the magnitude of the amount of exchanged data and the like set in the connection. In addition, depending on a communication status and the like, the period may not be a constant period and may be changed in a range not exceeding a worst value set in advance. In this way, the execution periods of exchange of safety input/output data using the communication processing units 260-1 to 260-4 are set as being independent from each other.

The exchanged safety IO data is stored in the main memory 204 as a safety IO data map 250. The main memory 204 storing the safety IO data map 250 corresponds to a data storing unit that stores safety input data to be referred to by one or a plurality of safety programs 2066 and safety output data output by executing one or a plurality of safety programs 2066.

In this way, in accordance with a connection setting set in advance for each communication processing unit 260, each of the communication processing units 260-1 to 260-4 periodically transmits safety output data for a target device stored in the safety IO data map 250 (a data storing unit) to the target device independently from the processes of the other communication processing units 260 and writes safety input data from the target device into the safety IO data map 250 (the data storing unit).

Every time when exchange of safety IO data in each connection is performed, a content of the safety IO data map 250 is updated. An update range of the safety IO data map 250 is basically independent for each connection.

The safety program 2066 executed by the safety control unit 200 refers to arbitrary safety input data (Safety Input) on the safety IO data map 250 and writes a result of the arithmetic operation into data corresponding to the safety output data (Safety Output). While the safety program 2066 can use arbitrary safety IO data on the safety IO data map 250, for example, as illustrated in FIG. 6, the safety program 2066 may be generated for each safety IO data exchanged in each connection.

The configuration example illustrated in FIG. 6 illustrates an example in which a safety program 2066-1 using only safety IO data exchanged in the first connection 12, a safety program 2066-2 using only safety IO data exchanged in the second connection 14, a safety program 2066-3 using only safety IO data exchanged in the third connection 16, and a safety program 2066-4 using only safety IO data exchanged in the fourth connection 18 are respectively executed.

Each of the safety programs 2066-1 to 2066-4 may be executed at independent periods. In order to satisfy a request for functional safety, a maximum execution period and the like of the safety program may be set, and, in such a case, the safety program is executed at a period according to each request.

In this way, each of the plurality of communication processing units 260-1 to 260-4 associates the safety programs 2066-1 to 2066-4 with each safety IO data exchanged with a target device, and accordingly, even in a case in which a malfunction occurs in a certain connection among a plurality of connections, there is no influence thereof on safety programs relating to the other connections.

Meanwhile, the configuration example illustrated in FIG. 7 illustrates an example in which a safety program 2066-12 using both safety IO data exchanged in the first connection 12 and safety IO data exchanged in the second connection 14 is executed.

By generating such a safety program relating to a plurality of connections, even among devices connected to different safety IO units 300, functional safety can be provided while device states thereof are mutually monitored.

As illustrated in FIGS. 6 and 7, in the safety control unit 200 according to this embodiment, a safety program can be generated without user's awareness of a connection in which safety IO data for a target device is exchanged.

Variables can be assigned in units of values or data to the safety IO data map 250 as illustrated in FIGS. 6 and 7. In the safety program, each value of the safety IO data may be designated using such variables. In other words, the safety program, by designating variables assigned to safety IO data stored in the safety IO data map 250 (the data storing unit), may refer to a value of corresponding safety IO data.

D. Transmission Process for Realizing Connection

Next, one example of a transmission process for realizing each connection will be described.

(d1: FSoE Frame on Local Bus 10)

First, FSoE frames exchanged between the safety control unit 200 and the safety IO unit 300 through the local bus 10 will be described. In other words, the safety control unit 200 exchanges safety IO data between the standard control unit 100 and the safety IO unit 300 connected to the safety control unit 200 through the local bus 10.

Figure 8:
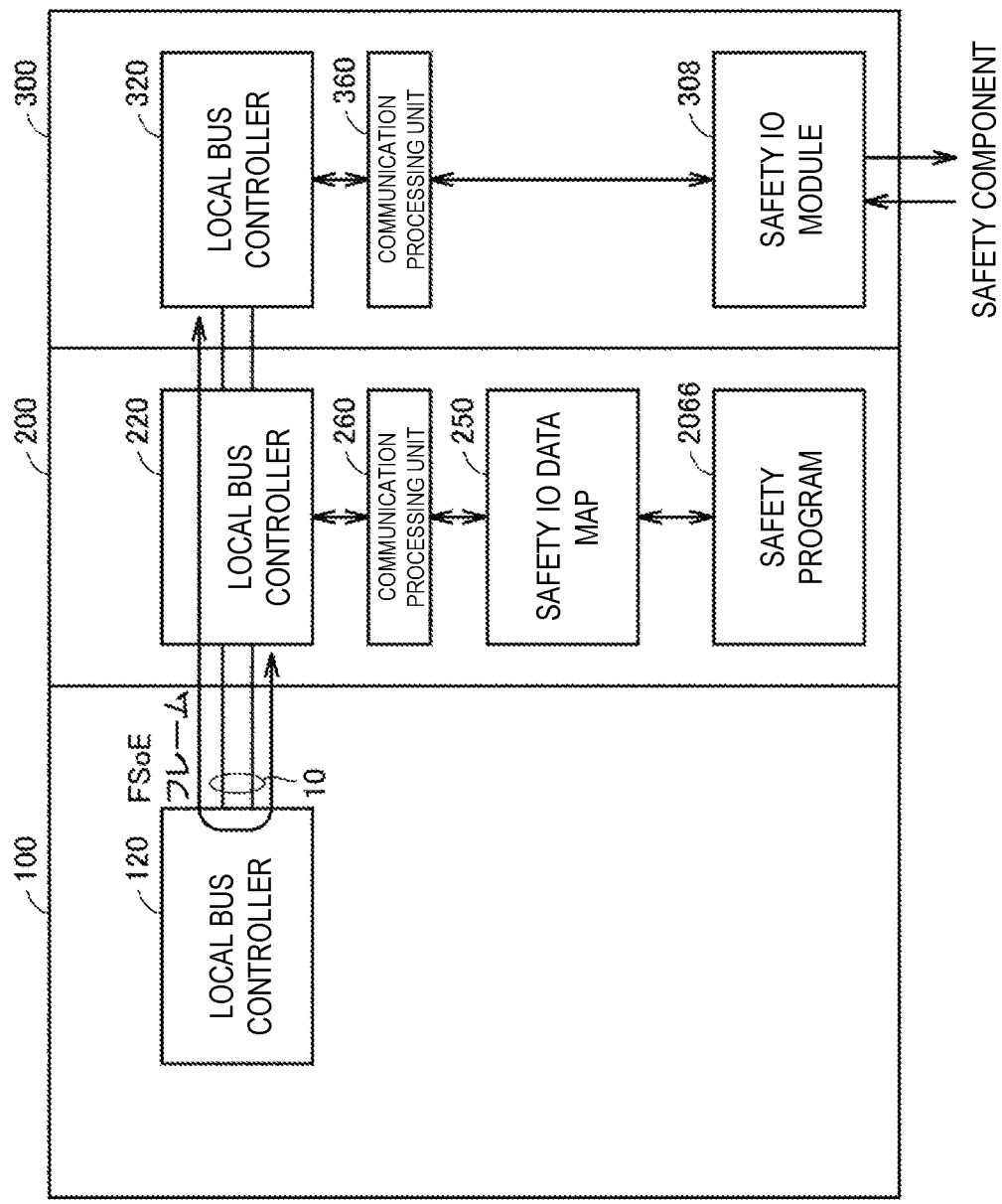
FIG. 8 is a schematic diagram illustrating realization of exchange of a Safety over Ethernet for Control Automation Technology (EtherCAT) (FSoE) frame in the control device of the safety control system according to this embodiment.

FIG. 8 is a schematic diagram illustrating realization of exchange of an FSoE frame in the control device 2 of the safety control system 1 according to this embodiment. As illustrated in FIG. 8, the local bus controller 120 of the standard control unit 100 functions as a communication master of the local bus 10 and is connected to the local bus controller 220 of the safety control unit 200 and the local bus controller 320 of the safety IO unit 300 through the local bus 10 to enable data transmission.

The safety control unit 200 includes a communication processing unit 260 for establishing a connection with the safety IO unit 300. Typically, the communication processing unit 260 is realized by the processor 202 of the safety control unit 200 executing the system program 2060.

The communication processing unit 260 reflects safety IO data transmitted/received by the local bus controller 220 on the safety IO data map 250. In other words, the communication processing unit 260 updates a corresponding value in the safety IO data map 250 with safety input data received in an FSoE frame from the safety IO unit 300, includes a value output to the safety IO data map 250 in accordance with execution of the safety program 2066 in the FSoE frame as safety output data, and transmits the resultant FSoE frame.

The safety IO unit 300 includes the safety IO module 308 as well as a communication processing unit 360 for establishing a connection with the safety control unit 200. Typically, the communication processing unit 360 is realized by the processor 302 of the safety IO unit 300 executing the system program 3060.

The communication processing unit 360 includes input data collected by the safety IO module 308 as the safety input data, where the safety input data is included in an FSoE frame for transmission. In addition, a control signal is output from the safety IO module 308 in accordance with the safety output data through the FSoE frame received by the safety IO module 308.

In the local bus 10, both the safety control unit 200 and the safety IO unit 300 are slave devices for communication, and accordingly, FSoE frames exchanged between two units are transmitted through the standard control unit 100 that is a communication master.

More specifically, frames with a predetermined size are periodically transmitted in the local bus 10, and an FSoE frame is transmitted as a message frame during an interval between the periodical transmissions of the frames. The FSoE frame transmitted from the safety control unit 200 is transmitted to the standard control unit 100 once and then is transmitted to a safety IO unit 300 as the target device. Similarly, the FSoE frame transmitted from the safety control unit 200 is transmitted to the standard control unit 100 once and then is transmitted to the safety control unit 200.

In accordance with transmission of FSoE frames on the local bus 10, a connection is established between the safety control unit 200 and the safety IO unit 300, and safety IO data is exchanged.

(d2: CIP Frame on Network)

Next, CIP frames exchanged with a different safety control unit 200, the safety IO unit 300 connected to the communication unit 400, the safety IO unit 300 connected to the standard control unit 100, and the like through a network will be described.

Although the safety control unit 200 is responsible for generation and decoding of a CIP frame in this embodiment, actual transmission/reception of CIP frames is assigned to the standard control unit 100. In other words, the communication processing unit 260 disposed in the safety control unit 200 exchanges safety IO data with a device that is a connection destination using the network controllers 108 and 110 that are network interfaces of the standard control unit 100.

Figure 9:
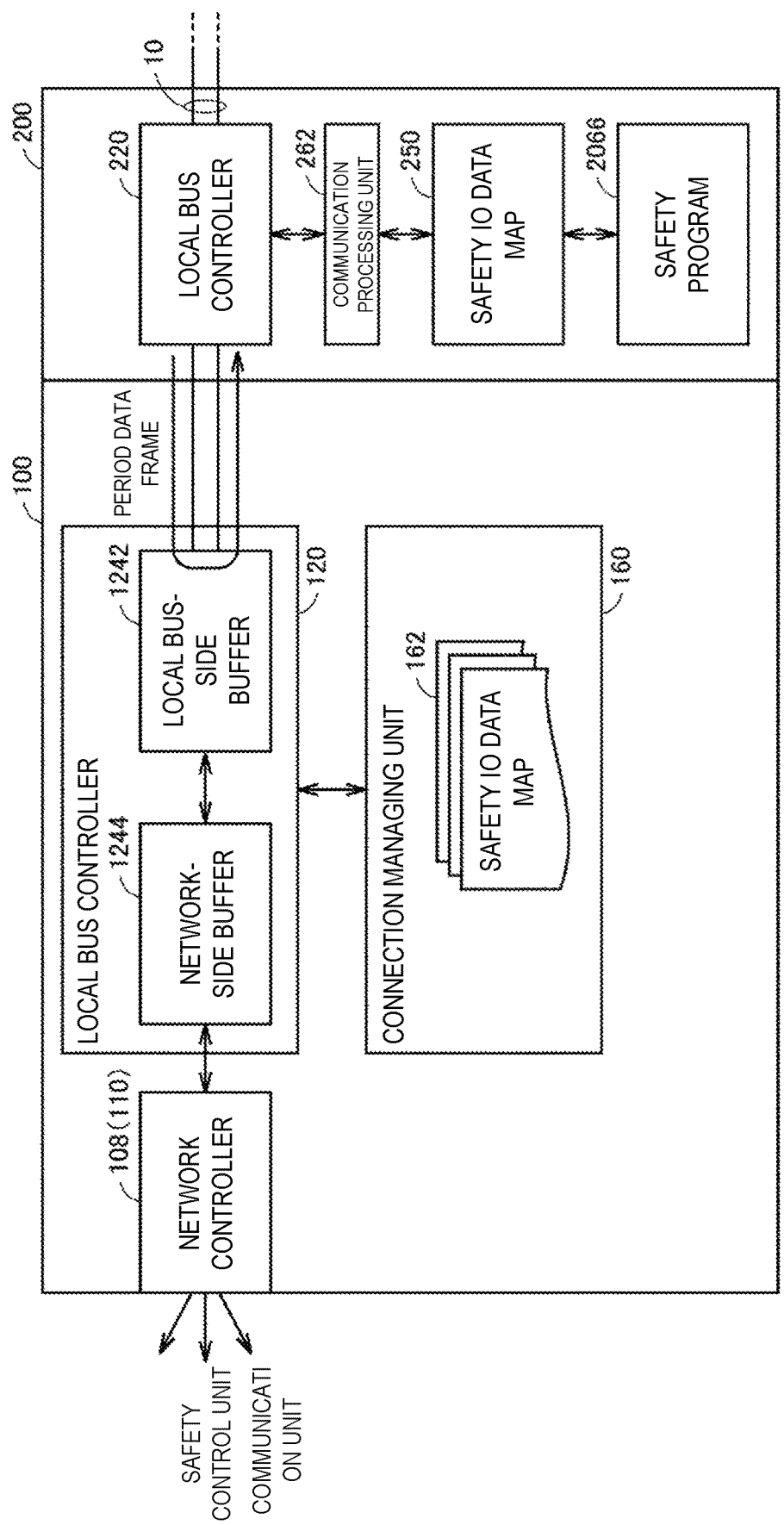
FIG. 9 is a schematic diagram illustrating realization of exchange of a common industrial protocol (CIP) frame in the control device of the safety control system according to this embodiment.

FIG. 9 is a schematic diagram illustrating realization of exchange of a CIP frame in the control device 2 of the safety control system 1 according to this embodiment. As illustrated in FIG. 9, the safety control unit 200 includes a communication processing unit 260 used for establishing a connection with another unit. Typically, the communication processing unit 262 is realized by the processor 202 of the safety control unit 200 executing the system program 2060.

In a case in which a CIP frame addressed to a target unit is to be transmitted, the communication processing unit 262 generates the CIP frame to be transmitted and transmits the generated CIP frame to the local bus controller 120 of the standard control unit 100 using a data frame that is periodically transmitted on the local bus 10. In addition, the communication processing unit 262 receives a CIP frame that is transmitted using a data frame periodically transmitted on the local bus 10 from any unit. This CIP frame is received by the network controllers 108 and 110 of the standard control unit 100 and is transmitted to the safety control unit 200 through the local bus 10 via the local bus controller 120.

The communication processing unit 262 reflects the safety IO data exchanged using the CIP frame on the safety IO data map 250. In other words, the communication processing unit 262 updates a corresponding value in the safety IO data map 250 with the safety input data received using the CIP frame from one unit, includes a value output to the safety IO data map 250 in accordance with execution of the safety program 2066 in the CIP frame as safety output data, and transmits the resultant CIP frame.

The standard control unit 100 includes a connection managing unit 160 connected to the local bus controller 120. The local bus controller 120 includes a local bus-side buffer 1242 and a network-side buffer 1244.

In the local bus-side buffer 1242, a data frame (including a CIP frame) transmitted from the safety control unit 200 is stored, and a data frame (including a CIP frame) that is received by the network controllers 108 and 110 and is transmitted to the safety control unit 200 is stored. In other words, the local bus-side buffer 1242 corresponds to a transmission/reception buffer for a data frame that is periodically transmitted on the local bus 10.

The network-side buffer 1244 corresponds to a buffer for a CIP frame that is transmitted/received by the network controllers 108 and 110. More specifically, in a case in which CIP frames are to be transmitted to a target unit, the connection managing unit 160 moves the CIP frames for transmission stored in the local bus-side buffer 1242 to the network-side buffer 1244 at appropriate timings with an appropriate order. On the other hand, in a case in which the network controllers 108 and 110 receive a CIP frame from one unit, the connection managing unit 160 moves CIP frames for transmission stored in the network-side buffer 1244 to the local bus-side buffer 1242 at appropriate timing in an appropriate order.

By relaying exchange of CIP frames between the safety control unit 200 and the local bus controller 120 and exchange of CIP frames between the network controllers 108 and 110 and a target unit, the connection managing unit 160 realizes exchange of the CIP frames between the safety control unit 200 and one unit connected through a network.

The connection managing unit 160 includes connection management information 162 and manages routing to a unit, which is a communication destination for each connection, set for the safety control unit 200 and the like. In addition, the safety control unit 200 adds connection identification information used for identifying each connection to a data frame, and the connection managing unit 160 identifies a destination to which a CIP frame transmitted from the safety control unit 200 is transmitted by referring to the connection identification information.

By employing such a configuration, the safety control unit 200 can establish an arbitrary connection with an arbitrary unit on a network through the local bus 10.

(d3: FSoE Frame on Network)

Transmission of an FSoE frame on the network is realized using exchange of a data frame between the safety control unit 200 and the standard control unit 100 through the local bus 10 in a form similar to that of the transmission of a CIP frame on the network. Here, detailed description thereof will not be repeated here.

(d4: Synchronous Refresh of Safety IO Data)

In the safety control system 1 according to this embodiment, the safety control unit 200 can establish one or a plurality of connections. The connections can be independent from each other, and, even in a case in which a certain malfunction occurs in one connection, there is no influence thereof on the other connections.

On the other hand, in a case in which update (also referred to as "IO refresh") of the safety IO data is performed at timings independent from each other in connections, there may be a deviation in update timings. In a case in which the safety program 2066 executed by the safety control unit 200 refers to safety IO data relating to a plurality of connections, it is preferable to decrease the deviation between the connections as possibly.

In such a case, a timing for data update between the local bus-side buffer 1242 and the network-side buffer 1244 in the local bus controller 120 may be optimized.

Figure 10:
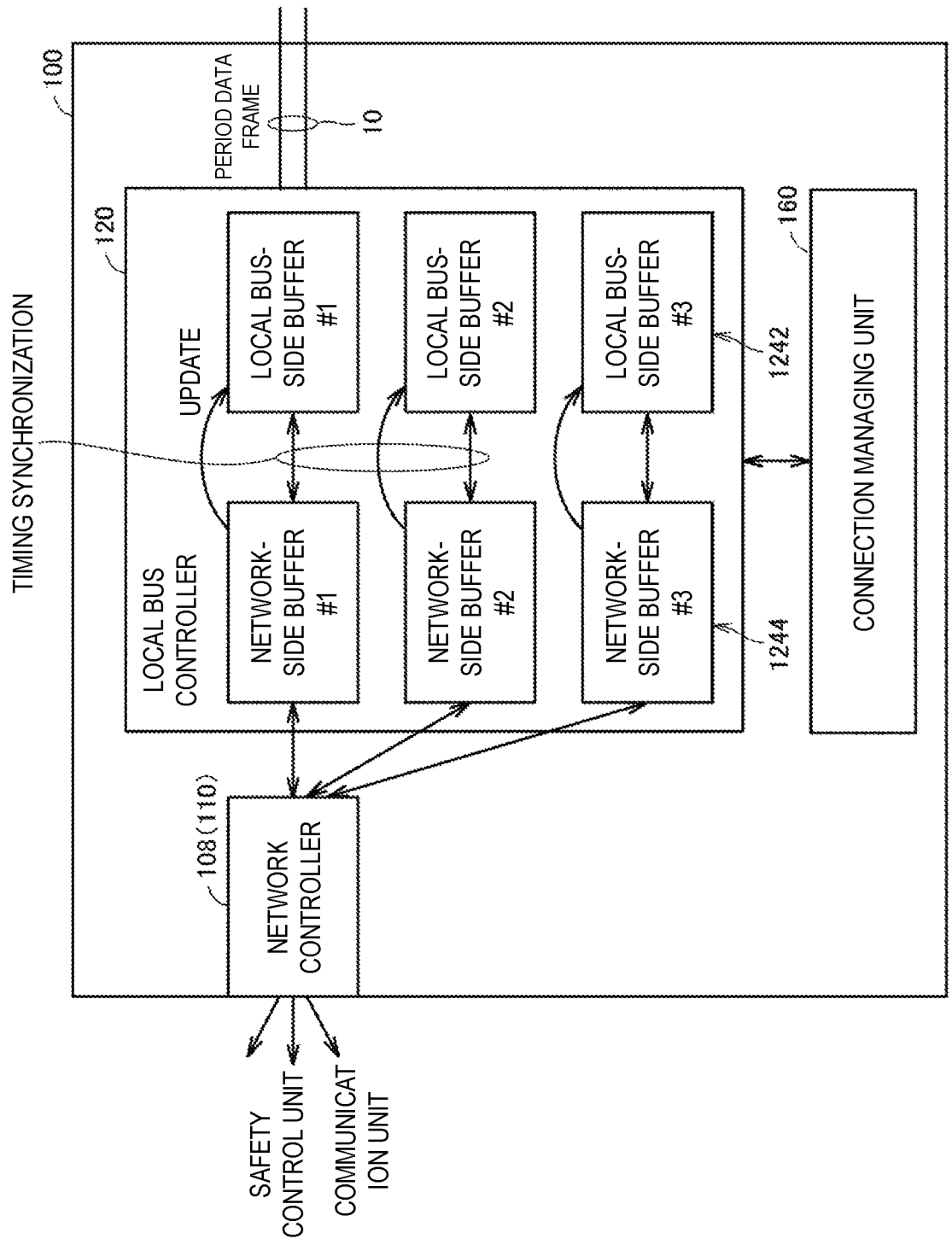
FIG. 10 is a schematic diagram illustrating one example of a data update in a local bus controller of the standard control unit of the safety control system according to this embodiment.

FIG. 10 is a schematic diagram illustrating one example of a data update in the local bus controller 120 of the standard control unit 100 of the safety control system 1 according to this embodiment. As illustrated in FIG. 10, for example, in the local bus controller 120 of the standard control unit 100, a local bus-side buffer 1242 and a network-side buffer 1244 are prepared for each connection.

The connection managing unit 160 controls a timing for data update for a set of the local bus-side buffer 1242 and the network-side buffer 1244, and accordingly, safety IO data for each connection can be updated for the safety control unit 200 at substantially same timings.

More specifically, the connection managing unit 160 simultaneously executes a data update for each set formed by the local bus-side buffer 1242 and the network-side buffer 1244 on the basis of a status and the like of exchange of a data frame in each connection. By performing the simultaneous update of data, timings of reflection of safety input data on the safety control unit 200 can be configured to coincide with each other. In addition, transmission timings of safety output data output from the safety control unit 200 to units can be configured to coincide with each other.

E. Modified Example

In the description presented above, mainly, although the control device 2 in which the standard control unit 100 and the safety control unit 200 are combined has been illustrated, the disclosure is not limited thereto. Thus, it is apparent that the technical idea of the disclosure can be applied also to a control device in which a plurality of standard control units 100 are combined and a control device in which a plurality of safety control units 200 are combined. In addition, the disclosure is not limited to the standard control unit and the safety control unit, and a combination of arbitrary control units may be employed.

In this embodiment, although a configuration in which the standard control unit 100 and the safety control unit 200 are combined has been mainly illustrated, the disclosure is not limited thereto, and the two units may be integrally configured. Also in such a case, featured processes as described above can be mounted.

F. Supplementary Note

This embodiment as described above includes a technical idea as described below.

[Configuration 1]

A safety control system (1) realizing functional safety including: an arithmetic operation processing unit (202) that executes one or a plurality of safety programs (2066); a data storing unit (204; 250) that stores safety input data referred to by the one or plurality of safety programs and safety output data output in accordance with execution of the one or plurality of safety programs; and a plurality of communication processing units (2062; 260) that exchange safety input/output data with a device that is a connection destination, wherein each of the plurality of communication processing units, independently from processes of the other communication processing units, periodically transmits safety output data for a target device stored in the data storing unit to the target device and writes safety input data from the target device into the data storing unit in accordance with a connection setting (2064) set in advance for each of the communication processing units.

[Configuration 2]

The safety control system described in Configuration 1, wherein a safety program is associated with each safety input/output data exchanged by each of the plurality of communication processing units with the target device.

[Configuration 3]

The safety control system described in Configuration 2, wherein execution periods of exchange of the safety input/output data executed by the plurality of communication processing units are independent from each other.

[Configuration 4]

The safety control system described in any one of Configurations 1 to 3, wherein the one or plurality of safety programs refer to values of corresponding safety input/output data by designating variables assigned to the safety input/output data stored in the data storing unit.

[Configuration 5]

The safety control system described in any one of Configurations 1 to 4, wherein the safety control system is formed from a standard control unit (100) that mainly executes standard control and a safety control unit (200) that mainly executes safety control, and wherein the arithmetic operation processing unit, the data storing unit, and the communication processing units are disposed in the safety control unit.

[Configuration 6]

The safety control system described in Configuration 5, wherein the standard control unit and the safety control unit are connected through a local bus (10), the standard control unit includes a network interface (108; 110), and the communication processing unit disposed in the safety control unit exchanges safety input/output data with a device that is a connection destination using the network interface of the standard control unit.

[Configuration 7]

The safety control system described in Configuration 6, wherein at least one communication processing unit among the plurality of communication processing units exchanges safety input/output data with the standard control unit and a safety input/output (IO) unit (300) connected to the safety control unit through the local bus.

[Configuration 8]

The safety control system described in any one of Configurations 1 to 7, at least one among the plurality of communication processing units exchanges safety input/output data with a device (200; 300) on a network in accordance with an Ethernet (registered trademark)-based communication protocol.

[Configuration 9]

A safety control unit (200) realizing functional safety including: an arithmetic operation processing unit (202) that executes one or a plurality of safety programs (2066); a data storing unit (204; 250) that stores safety input data referred to by the one or plurality of safety programs and safety output data output in accordance with execution of the one or plurality of safety programs; and a plurality of communication processing units (2062; 260) that exchange safety input/output data with a device that is a connection destination, wherein each of the plurality of communication processing units, independently from processes of the other communication processing units, periodically transmits safety output data for a target device stored in the data storing unit to the target device and writes safety input data from the target device into the data storing unit in accordance with a connection setting (2064) set in advance for each of the communication processing units.

G. Advantage

A system realizing safety control for realizing functional safety is requested to have a high degree of reliability. In addition, even in a case in which a malfunction occurs in the function of the safety control, there is a request for localizing a deficient range of a reduction range of the control function. While there is a solution of individually preparing a safety controller for each target device for such a request, there is a possibility of causing a high cost in various aspects. More specifically, a safety controller having a high level of reliability is relatively highly priced, and, by disposing a plurality of safety controllers, a hardware cost may increase. In addition, by disposing a plurality of safety controllers within the system in a distributed manner, a design cost and a maintenance cost may increase.

In contrast to this, in the safety control system 1 according to this embodiment, a plurality of connections can be established using a single safety control unit, and, even in a case in which a malfunction occurs in one connection, there is no substantial influence on the other connections, and safety control can be continued.

In this way, according to this embodiment, even in a large-scale system, flexible safety control can be realized, and, even in a case in which a malfunction occurs in one connection, the influence thereof can be localized.

According to one example of the disclosure, a safety control system realizing functional safety is provided. The safety control system includes: an arithmetic operation processing unit that executes one or a plurality of safety programs, a data storing unit that stores safety input data referred to by the one or plurality of safety programs and safety outputs data output in accordance with execution of the one or plurality of safety programs, and a plurality of communication processing units that exchange safety input/output data with a device that is a connection destination. Each of the plurality of communication processing units, independently from processes of the other communication processing units, periodically transmits safety output data for a target device stored in the data storing unit to the target device and writes safety input data from the target device into the data storing unit in accordance with a connection setting set in advance for each of the communication processing units.

According to this disclosure, by performing a connection setting unique for each of the plurality of communication processing units, safety input/output data can be exchanged with a plurality of devices, and, accordingly, a plurality of functional safeties associated with respective device can be realized.

In the disclosure described above, a safety program may be associated with each piece of safety input/output data exchanged by each of the plurality of communication processing units with the target device. According to this disclosure, even in a case in which an abnormality occurs in one connection (communication processing unit), the abnormality has no influence on execution of safety programs associated with the other connections.

In the disclosure described above, execution periods of exchange of the safety input/output data executed by the plurality of communication processing units may be independent from each other. According to this disclosure, the safety input/output data can be exchanged at a period according to a setting or a status of each connection.

In the disclosure described above, the one or plurality of safety programs may refer to values of corresponding safety input/output data by designating variables assigned to the safety input/output data stored in the data storing unit. According to this disclosure, a person generating a safety program can generate the safety program without being aware of a connection (communication processing unit) responsible for update of each safety input/output data.

In the disclosure described above, the safety control system may be formed of a standard control unit that mainly executes standard control and a safety control unit that mainly executes safety control, wherein the arithmetic operation processing unit, the data storing unit, and the communication processing units may be disposed in the safety control unit. According to this disclosure, safety control can be executed separately from standard control, and the reliability of the safety control can be improved.

In the disclosure described above, the standard control unit and the safety control unit are connected through a local bus, the standard control unit includes a network interface, and the communication processing unit disposed in the safety control unit may exchange safety input/output data with a device that is a connection destination using the network interface of the standard control unit. According to this disclosure, a network interface does not need to be disposed in the safety control unit, and, accordingly, the configuration can be simplified.

In the disclosure described above, at least one communication processing unit among the plurality of communication processing units may exchange safety input/output data with the standard control unit and a safety input/output (IO) unit connected to the safety control unit through the local bus. According to this disclosure, safety control can be realized using the safety input/output data managed by the safety IO unit connected to a common local bus.

In the disclosure described above, at least one among the plurality of communication processing units may exchange safety input/output data with a device on a network in accordance with an Ethernet (registered trademark)-based communication protocol. According to this disclosure, safety control can be realized while using Ethernet that is a general-purpose communication protocol.

According to one example of this disclosure, a safety control unit realizing functional safety is provided. The safety control unit includes: an arithmetic operation processing unit that executes one or a plurality of safety programs, a data storing unit that stores safety input data referred to by the one or plurality of safety programs and safety output data output in accordance with execution of the one or plurality of safety programs, and a plurality of communication processing units that exchange safety input/output data with a device that is a connection destination. Each of the plurality of communication processing units, independently from processes of the other communication processing units, periodically transmits safety output data for a target device stored in the data storing unit to the target device and writes safety input data from the target device into the data storing unit in accordance with a connection setting set in advance for each of the communication processing units.

According to the disclosure, comprehensive safety control for a manufacturing site can be realized.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A safety control system for realizing functional safety, the safety control system comprising a processor and a memory, the processor being configured by executing a program stored in the memory to function as:
    an arithmetic operation processing unit that executes one or a plurality of safety programs;
    a data storing unit that stores safety input data referred to by the one or plurality of safety programs and safety output data output in accordance with execution of the one or plurality of safety programs; and
    a plurality of communication processing units that exchange safety input/output data with a device that is a connection destination and a security target device,
    wherein each of the plurality of communication processing units, independently from processes of the other communication processing units, is configured to periodically transmit safety output data for the security target device from the connection destination stored in the data storing unit to the security target device and is configured to write safety input data from the security target device into the data storing unit in accordance with a connection setting set defining a communication period in advance for each of the communication processing units as being independent from each other,
    wherein the communication period defined in the connection set by the communication processing unit is a transmission/reception period of the safety input/output data of each of the communication processing units which is set in advance on a basis of a setting and status of each connection.

2. The safety control system according to claim 1, wherein a safety program is associated with each of the safety input/output data exchanged by each of the plurality of communication processing units with the target device.

3. The safety control system according to claim 2, wherein execution periods of exchange of the safety input/output data executed by the plurality of communication processing units are independent from each other.

4. The safety control system according to claim 3, wherein the one or plurality of safety programs refer to values of corresponding safety input/output data by designating variables assigned to the safety input/output data stored in the data storing unit.

5. The safety control system according to claim 1, wherein the one or plurality of safety programs refer to values of corresponding safety input/output data by designating variables assigned to the safety input/output data stored in the data storing unit.

6. The safety control system according to claim 2, wherein the one or plurality of safety programs refer to values of corresponding safety input/output data by designating variables assigned to the safety input/output data stored in the data storing unit.

7. The safety control system according to claim 1,
    wherein the safety control system is formed from a standard control unit that mainly executes standard control and a safety control unit that mainly executes safety control, and
    wherein the arithmetic operation processing unit, the data storing unit, and the communication processing units are functions configured in the processor of the safety control unit by executing the program.

8. The safety control system according to claim 7,
    wherein the standard control unit and the safety control unit are connected through a local bus,
    wherein the standard control unit includes a network interface, and
    wherein the communication processing unit configured by the processor in the safety control unit exchanges safety input/output data with the device that is the connection destination using the network interface of the standard control unit.

9. The safety control system according to claim 8, wherein at least one communication processing unit among the plurality of communication processing units exchanges safety input/output data with the standard control unit and a safety input/output (IO) unit connected to the safety control unit through the local bus.

10. The safety control system according to claim 1, wherein at least one among the plurality of communication processing units exchanges safety input/output data with a device on a network in accordance with an Ethernet-based communication protocol.

* * * * *